United States Patent [19]
Plasser et al.

[11] 3,808,693
[45] May 7, 1974

[54] MOBILE TRACK GAGE SURVEYING APPARATUS

[76] Inventors: Franz Plasser; Josef Theurer, both of Johannesgasse 3 A-1010, Vienna, Austria

[22] Filed: Sept. 28, 1972

[21] Appl. No.: 292,878

[30] Foreign Application Priority Data
Oct. 4, 1971 Austria .............................. 8526/71

[52] U.S. Cl. ................ 33/144, 105/178, 105/215 R, 104/33, 104/1
[51] Int. Cl. ......................... G01b 7/04, B61k 9/00
[58] Field of Search ............ 33/144, 146, 1 Q, 338; 104/1, 32, 33; 105/178

[56] References Cited
UNITED STATES PATENTS

| | | | |
|---|---|---|---|
| 1,003,886 | 9/1911 | Dobbins | 33/146 |
| 1,211,180 | 1/1917 | Krake | 33/146 |
| 1,285,431 | 11/1918 | Shipwash | 33/146 |
| 2,098,938 | 11/1937 | Backes | 33/146 |
| 3,381,383 | 5/1968 | McIlrath | 33/146 |
| 3,392,451 | 7/1968 | Lombardo | 33/146 |

*Primary Examiner*—John W. Huckert
*Assistant Examiner*—Jon W. Henry
*Attorney, Agent, or Firm*—Kurt Kelman

[57] ABSTRACT

Two flanged wheels transversely pressed against the track rails survey the track gage as the spacing between the rail sensing wheels changes. A pivot connection is provided between pivotal carriers of the wheels, the pivot connection being positioned outside an imaginary straight line connecting the wheel axes and the pivot axis thereof being substantially parallel to a vertical plane defined by the track axis. A measuring device is actuatable by the relative movement of the wheels in respect of each other, the measuring device being connected to the pivotal carriers at a distance from the pivot axis.

17 Claims, 4 Drawing Figures

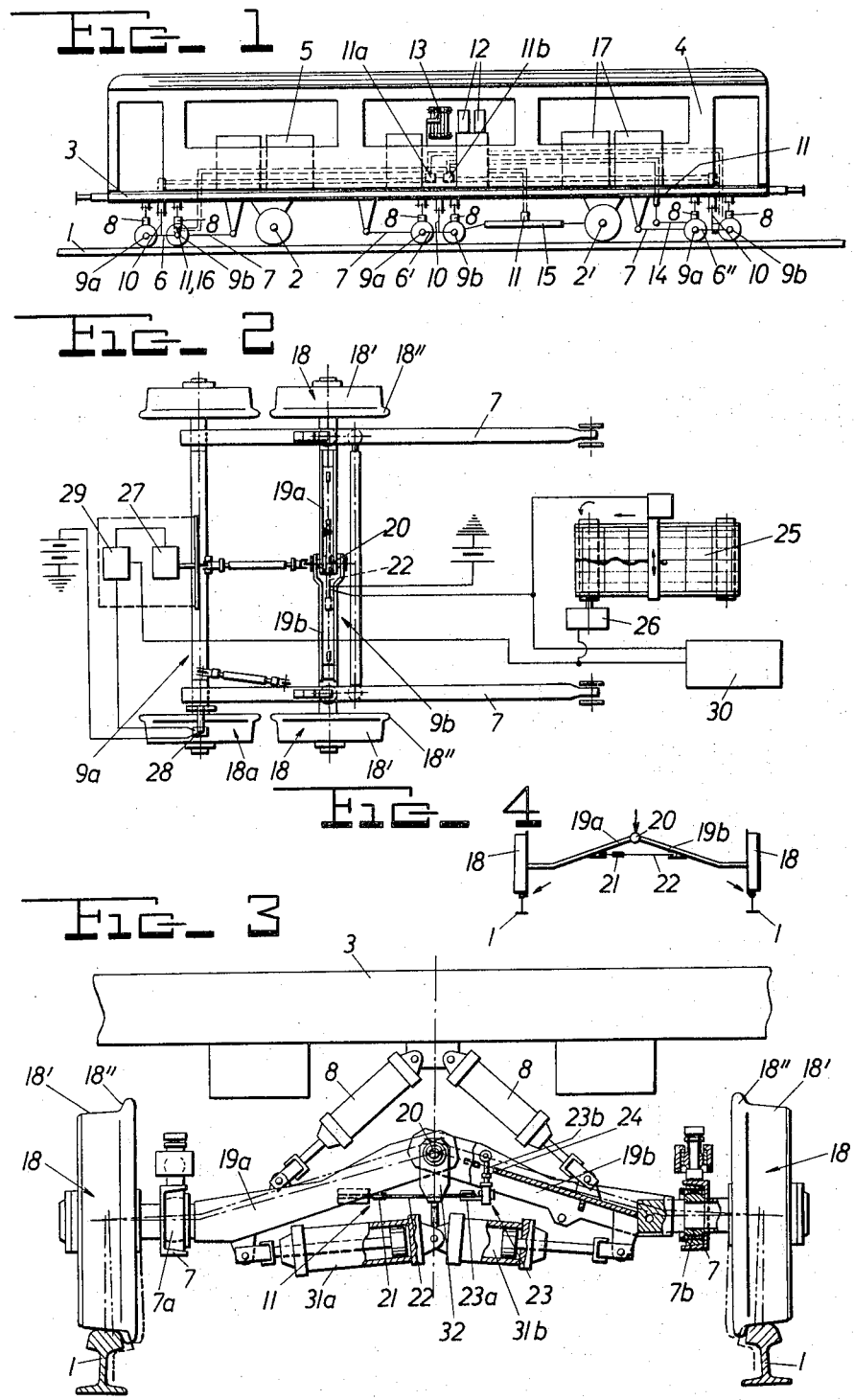

MOBILE TRACK GAGE SURVEYING APPARATUS

The present invention relates to improvements in a mobile apparatus for surveying the gage of a track having a longitudinally extending axis centered between, and parallel to, the track rails.

Known apparatus of this type comprises two rail sensing elements, such as flanged wheels running on the track rails, each of which has an axis and which may be laterally pressed against a respective one of the track rails for sensing the position of the track and for absorbing vertical components of the pressure forces directed against the track rails, each of the sensing elements being movable transversely to the track axis and the spacing between the sensing elements being changeable. A measuring device is actuatable by the relative movement of the sensing elements in respect of each other. Two telescoping cross beams carry the sensing elements, the relative movement of the two beams measuring changes in the track gage.

Such track gage bogies are expensive to construct because they require accurately dimensioned cooperating parts to assure straight guides for the relatively moving parts. However, track maintenance work is rough and subjects these precision machined parts to great wear and exposure to dust and other dirt causing serious plays to occur between the moving parts during prolonged operations. This impairs not only the life of the apparatus but also the gaging accuracy. Structural conditions also make it necessary to make the diameter of the rail sensing wheels small, which produces problems at switches or crossings because wheels with small diameters will readily leave the track at such points.

It is the primary object of this invention to overcome the above disadvantages and to provide a mobile track gage surveying apparatus of the indicated type which assures not only accurate measurements but also is very simple in construction and permits safe use at switches and crossings.

The above and other objects are accomplished in accordance with the invention by positioning a pivotal connection between pivotal carriers for each sensing element outside an imaginary straight line connecting the axes of the sensing elements, with the pivot axis being substantially parallel to a vertical plane defined by the track axis. The measuring device is connected to the pivotal carriers of the sensing elements at a distance from the pivot axis.

In this manner, the two sensing elements are interconnected securely and absolutely free from play because the pivot connection assures complete and full contact between the sensing elements and the associated track rails under all operating conditions and without being influenced by accumulating dirt or surrounding conditions. The measuring accuracy is increased considerably because there are no measurable plays in the connection between the two sensing elements. Furthermore, the structure makes it possible to use sensing elements of large diameter so as to avoid derailments at switches and crossings.

A simple construction is assured when the pivotal carriers are arms having two ends, with the inner ends of the carrier arms being connected by the pivot connection and the outer ends thereof having the sensing elements affixed thereto. Using a single pivot connection reduces the number of the mechanical parts of the apparatus to a minimum and also reduces the sources of possible malfunctioning or errors.

If the pivoting plane of the carrier arms is vertical and the pivotal connection is positioned above the imaginary straight line, the apparatus will be particularly stable and gaging errors resulting from an undesired oblique positioning of the apparatus in relation to the track will be reduced or avoided.

To maintain the two sensing elements at a fixed distance while the apparatus passes over switches and crossings and to avoid pressing one of the two sensing elements unintentionally against the branch rail, it is useful to provide limit means for limiting the pivoting of the carrier arms at least in an outward direction. For this purpose, a pneumatically operated cylinder-and-piston unit may be mounted below each carrier arm, the piston rod of each unit being linked to an associated carrier arm, and a vertical guide element is linked to the cylinders of the units.

For continuously surveying the track gage, longitudinally extending guide elements may have one end linked to the underside of a frame mounted for running on the track, such as a track survey or maintenance car, with a ball-and-socket joint connecting a respective guide element to an associated pivotal carrier adjacent a respective sensing element.

To assure uniform and complete contact between the sensing elements and the rail heads, it is useful to connect a pressure means, such as a hydraulic motor between the frame and the pivotal carriers for laterally pressing the carriers against an associated track rail. The effective axis of the pressure means extends substantially from the center of the frame towards the contact point of the respective sensing element with the associated track rail. In this manner, a force component is transmitted to the parts of the sending elements contacting the top and side of the rail head so as to assure a secure guidance of the sending elements on the rail.

The above and other objects, advantages and features of the present invention will become more apparent from the following detailed description of a now preferred embodiment of this invention, taken in conjunction with the accompanying drawing wherein FIG. 1 is a side view of a track survey car carrying the track gage of this invention as well as other devices for surveying track conditions;

FIG. 2 is a top view of an embodiment of this invention;

FIG. 3 is a front view of this embodiment, partly in section; and

FIG. 4 is a simplified schematic illustration of the apparatus more fully shown in FIGS. 2 and 3.

Referring now to the drawing and first to FIG. 1, there is shown a frame 3 of a track survey car 4 running on track rails 1 with main undercarriages 2, 2'. Undercarriage 2 may constitute the drive axle with drive motor 5 so that the survey car is self-propelled. A number of measuring bogies 6, 6', 6'' are mounted on the frame, guide rods 7 being linked to the underside of frame 3 and connecting the measuring bogies to the frame. Hydraulic motors 8 can be used to lift the measuring bogies off the track rails or to press their axles 9a, 9b against the rails. The relative movement of the surveying axles 9a, 9b of each bogie is transmitted by pivotal connecting rods 10 to the signaling devices 11 and 11b whose signals are indicated at 12 and permanently recorded at 13 to establish the lateral position of the left and right rails. Other track parameters are measured at 14, 15 and 16, all of these surveying devices being electrically connected to signaling devices 11 and signal indicating and recording devices 12 and 12, computers 17 being mounted on the car to evaluate the measuring signals.

The present invention is concerned solely with the apparatus 16 for surveying the gage of the track and, therefore, the following detailed description will be limited thereto. In the bogie 16, which is more fully shown in FIG. 2, the axle 9b serves as the apparatus for surveying the track gage. The axles 9a and 9b of the bogie carry flanged wheels 18 which may be laterally pressed against a respective one of the track rails 1, 1, with the flanged wheels 18 serving as self-supporting sensing elements for surveying the track gage.

The flanged wheels are rotatably journaled to the free outer ends of pivotal carrier arms 19a, 19b whose inner ends are connected by a pivotal connection 20 arranged centrally between the track rails and whose pivot axis is parallel to a vertical plane passing through an axis centered between, and parallel to, rails 1. This pivot connection is positioned outside an imaginary straight line connecting the axes of the flanged sensing wheels 18, 18, the pivot connection being above this imaginary line so that the flanged wheels are pressed apart by a force directed downwardly against the pivot connection and thus are pressed firmly against the rail heads, as schematically shown in FIG. 4. Due to this pressure, the running surfaces 18' of the wheels absorb the vertical components of the pressure forces and the weight of the apparatus while the flanges 18'' absorb the horizontal forces.

A measuring device 11, which is actuatable by the relative movement of the sensing wheels 18, 18 in respect of each other, is constituted by a signaling device converting the relative spacing between the wheels into proportional electrical measuring signals. As shown in FIG. 3, measuring device 11 is a wire strain gage 21 bonded to a flexible rod 22, i.e. a leaf spring. The flexible rod is connected between the sensing element carriers 19a, 19b and extends transversely of the track, being connected to the carrier arms 19a, 19b at a distance from pivot connection 20. One end of the flexible rod is fixedly connected to arm 19a while the other flexible rod end is pivotally connected to arm 19b. The pivotal connection of the other rod end to arm 19b comprises an angle connection piece 23 whose one arm 23b is linked to carrier arm 19b while the other angle connection piece arm 23a is connected to the other flexible rod end. The one connection piece arm 23b has two telescoping parts, and a set screw 24 is provided for fixing the two parts in position at a desired and adjustable length of arm 23b. In this manner, the measuring device, i.e. the tension of the bending of the flexible rod 22 may be adjusted to a desired initial value.

Wire strain gauge 21 is arranged near the fixedly held end of the flexible rod by being adhesively mounted on the rod, the resistance of the gauge changing with the flexing of the rod so as to produce proportional electrical measuring signals which are transmitted to an indicator and recording device 25 (see FIG. 2) from which the measured track gage may be read. The drum of the recorder 25 is driven by a stepping motor 26 operated by pulse generator 27 connected to a tachometer axle rotated by one of the wheels, i.e. wheel 18a. In order to correct automatically any errors in the pacing of the drive for the recorder drum, which may be caused by increasing wear on wheel 18a, an inductive device 28 is arranged at a fixed distance from wheel 18a. An electronic correction device 29 compensates for any changes in the distance between the inductive device 28 and the running face of wheel 18a, due to the wear of the wheel, and thus changes the pulses transmitted to the motor 26 so as to correct the drive for the drum of recorder 25. The measuring signals are further transmitted to a computer unit 30 which evaluates the measured parameters and delivers a number characteristic of the track condition.

Instead of a wire strain gauge, the measuring device may consist of an inductive motion pickup device having a housing connected to carrier arm 19a and a plunger-type armature connected to carrier arm 19b. The resultant measuring signal is again transmitted to recorder 25.

In order to avoid that the flanged wheels 18 are unintentionally pressed into the branch track when the apparatus passes a switch or crossing, pneumatically operated cylinder-and-piston units 31a, 31b are mounted below carrier arms 19a, 19b, the piston rod of each unit being linked to an associated carrier arm and a vertical guide element 32 linking the pivot connection 20 to the cylinders of the units. In this manner, the two pivotal arms 19a, 19b may be locked in position, i.e. their pivotal movement may be limited in an outward direction when pressure fluid is applied to the units 31a, 31b. In the locked position, of course, the apparatus no longer functions to measure the track gage although the cylinder and piston may be so arranged that a narrowing of the gage will be indicated when it reaches a predetermined lower limit (see chain dotted lines in FIG. 3).

The pivotal carriers 19a, 19b are connected adjacent flanged wheels 18 to one end of longitudinally extending guide elements or rods 7 by means of ball-and-socket joints 7a, 7b. As shown in FIG. 3, channel-shaped guide rods 7 define a socket receiving a conformingly shaped portion of the pivotal carriers so that a ball-and-socket joint is formed between each carrier and associated guide rod. The other end of the elements 7 being linked to the underside of car frame 3. Furthermore, a hydraulic motor 8 connects each pivotal carrier to the frame for laterally pressing the carriers against an associated track rail 1, the effective axis of the pressure extending substantially from the center of the frame towards the contact point of the respective flanged wheel 18 with the associated track rail.

If desired, the track gage measuring apparatus could be an independent unit, i.e. it need not be connected to frame 3 but the guide rods 7 could be provided with handles so that the apparatus could be manually guided over the track. In this case, the pressure on the sensing wheels 18 may be exerted simply by the weight of the apparatus or an extra weight arranged adjacent pivot connection 20. Also, the sensing elements need not be flanged wheels but could be rollers pressed against the rail heads. Other modifications and variations may occur to those skilled in the art.

What is claimed is:

1. A mobile apparatus for surveying the gage of a track having a longitudinally extending axis centered between, and parallel to, the track rails, comprising 1. two rail sensing elements each of which has an axis,
2. means for changing the spacing between the rail sensing elements,
3. a pair of pivotal carriers extending transversely of the track between the rail sensing elements,
   a. each pivotal carrier having an outer and an inner end, and
   b. the outer end of each pivotal carrier supporting a respective one of the rail sensing elements,
4. a pivot connection for the inner ends of the pivotal carriers for pivoting the carriers about an axis,
   a. the pivoting axis being substantially parallel to a vertical plane passing through the track axis and
   b. the pivot connection being positioned outside an imaginary line connecting the axes of the rail sensing elements,
5. means for pivoting the carriers about the pivoting axis whereby the rail sensing elements are moved transversely of the track into engagement with a respective one of the rails, and
6. a measuring device actuatable by the pivoting movement of the carriers and connected thereto at a distance from the pivoting axis.

2. The mobile apparatus of claim 1, wherein the sensing elements are flanged wheels running on the track rails.

3. The mobile apparatus of claim 1, wherein the pivoting plane of the carriers is vertical and the pivotal connection is positioned above the imaginary straight line.

4. The mobile apparatus of claim 1, further comprising limit means for limiting the pivoting of the carriers at least in an outward direction.

5. The mobile apparatus of claim 4, wherein the limit means comprises a pressure fluid operated cylinder-and-piston unit mounted below each of the carrier, the piston rod of each unit being linked to an associated one of the carriers and the cylinder of each unit being linked to the pivot connection.

6. The mobile apparatus of claim 1, wherein the measuring device is a signaling device converting the relative spacing between the sensing elements into proportional electrical measuring signals, and further comprising a recording device for reading the signals.

7. The mobile apparatus of claim 6, wherein the signaling device is a wire strain gauge on a flexible rod extending transversely to the track and connected between the sensing element carriers.

8. The mobile apparatus of claim 7, wherein the flexible rod is a leaf spring.

9. The mobile apparatus of claim 7, wherein one end of the flexible rod is fixedly connected to one of the pivotal carriers and the other end of the flexible rod is pivotally connected to the other pivotal carrier.

10. The mobile apparatus of claim 9, further comprising an angle connection piece having two arms, one of the angle connection piece arms being linked to the other pivotal carrier and the other connection piece arm being connected to the other end of the flexible rod.

11. The mobile apparatus of claim 10, further comprising means for adjusting the length of the one angle connection piece arm.

12. The mobile apparatus of claim 11, wherein the one angle connection piece arm has two telescoping parts, and the adjusting means comprises a set screw for fixing the two parts in position at a desired length of the one angle connection piece arm.

13. The mobile apparatus of claim 9, wherein the wire strain gauge is arranged near the one flexible rod end.

14. The mobile apparatus of claim 13, wherein the wire strain gauge is bonded to the flexible rod.

15. The mobile apparatus of claim 1, further comprising a frame mounted for running on the track, longitudinally extending rods having one end linked to the underside of the frame, and ball-and-socket joints connecting a respective one of the rods to an associated one of the pivotal carriers adjacent a respective one of the sensing elements.

16. The mobile apparatus of claim 15, further comprising a pressure means connecting a respective one of the pivotal carriers to the frame for laterally pressing the carriers against an associated one of the track rails.

17. The mobile apparatus of claim 16, wherein the pressure means is a hydraulic motor.

* * * * *